[19] United States Patent
Kuberka et al.

[11] Patent Number: 5,695,285
[45] Date of Patent: Dec. 9, 1997

[54] APPARATUS FOR CONTAINING A TEMPERATURE SENSING DEVICE

[75] Inventors: Jeffrey A. Kuberka, Madison; Michael F. Mattes, Janesville; James D. Seefeldt, DeForest; William J. Day, Janesville, all of Wis.

[73] Assignee: SSI Technologies, Inc., Janesville, Wis.

[21] Appl. No.: 692,985

[22] Filed: Aug. 7, 1996

Related U.S. Application Data

[63] Continuation of Ser. No. 286,377, Aug. 5, 1994, abandoned.
[51] Int. Cl.$^6$ .................. G01K 7/00; H01L 35/02
[52] U.S. Cl. .................. 374/208; 374/163; 136/230; 136/233
[58] Field of Search .................. 374/100, 120, 374/163, 165, 189, 208, 209, 179, 183, 185, 188; 236/DIG. 12, DIG. 19; 165/28; 136/230, 232, 233; 338/14, 22 R, 72, 205, 239, 240, 244

[56] References Cited

U.S. PATENT DOCUMENTS

| | | | |
|---|---|---|---|
| 2,961,625 | 11/1960 | Sion | 374/165 |
| 4,556,327 | 12/1985 | Kalil | 374/120 |
| 4,560,973 | 12/1985 | Grimm et al. | 374/165 |
| 4,659,236 | 4/1987 | Hobbs | 374/208 |
| 4,689,599 | 8/1987 | Calenda et al. | 337/380 |
| 4,841,274 | 6/1989 | Yagher, Jr. et al. | 374/208 |
| 5,046,857 | 9/1991 | Metzger et al. | 374/208 |
| 5,088,835 | 2/1992 | Shigezawa et al. | 136/230 |
| 5,176,451 | 1/1993 | Sasada et al. | 374/208 |
| 5,372,427 | 12/1994 | Padovani et al. | 374/208 |

OTHER PUBLICATIONS

The Hewlett Packard Company, "Application Note 290–Practical Temperature Measurements", pp. Z–7 – Z–28.

Primary Examiner—William A. Cuchlinski, Jr.
Assistant Examiner—Andrew Hirshfeld
Attorney, Agent, or Firm—Michael, Best & Friedrich

[57] ABSTRACT

A temperature sensor assembly for measuring ambient temperature and including a housing defining an enclosure. A temperature sensor is mounted within the enclosure. The housing includes a brass cap and a liner for conducting heat from the brass cap to the temperature sensor. The temperature sensor is mounted on the brass liner and is electrically insulated from the brass liner by a thermally conductive material.

21 Claims, 2 Drawing Sheets

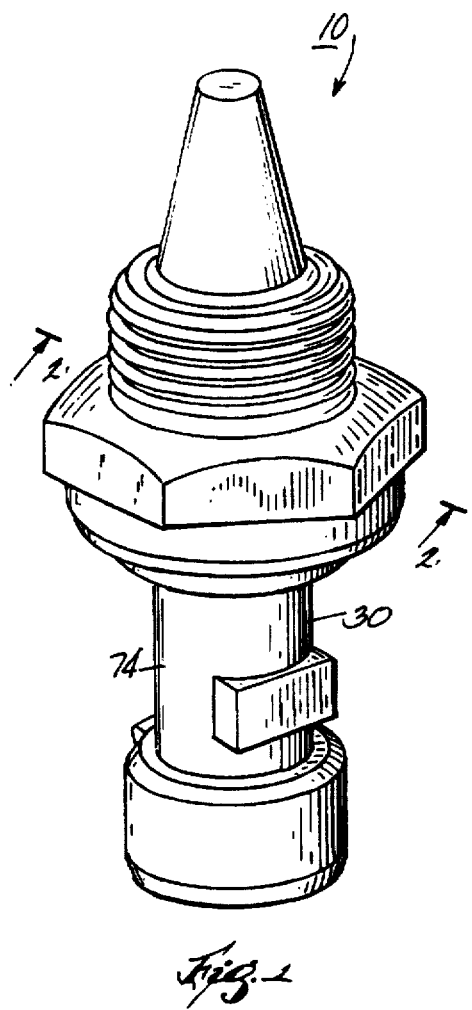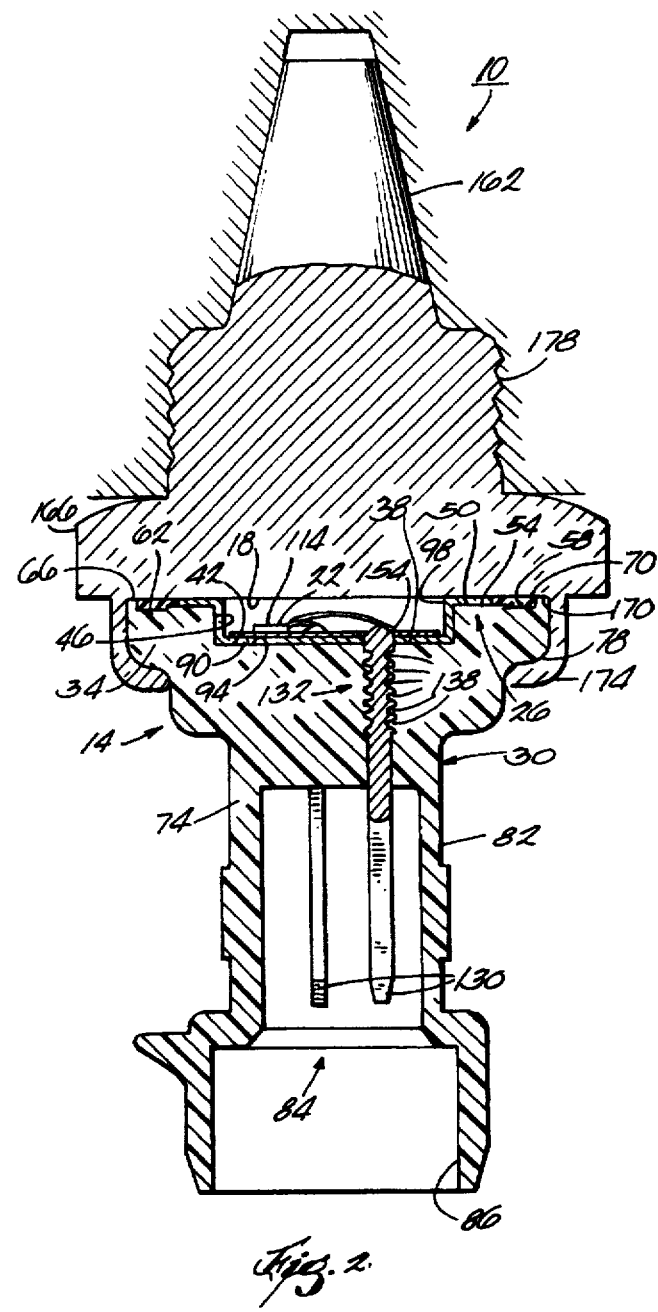

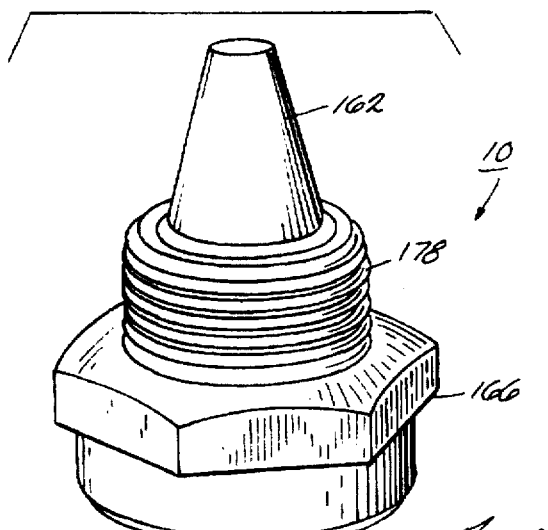
Fig. 3
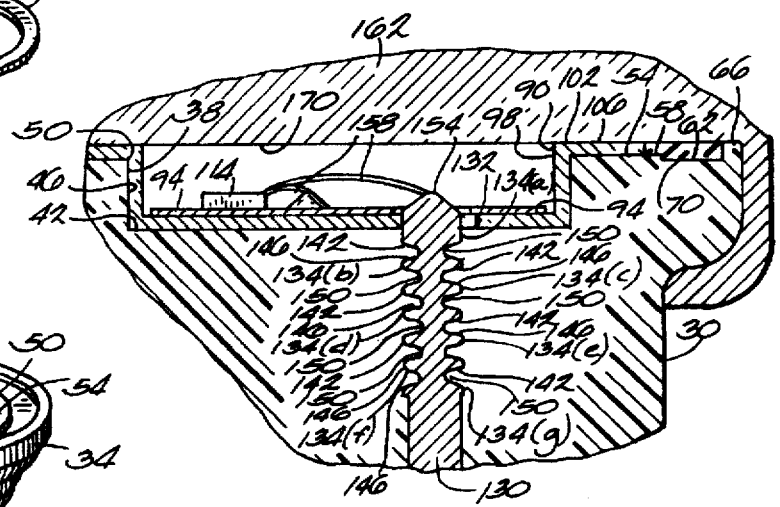
Fig. 4
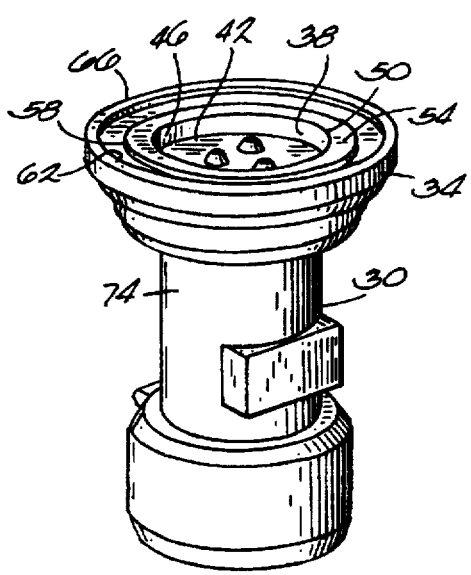

APPARATUS FOR CONTAINING A TEMPERATURE SENSING DEVICE

This is a Continuation of application Ser. No. 08/286,377, filed Aug. 5, 1994, now abandoned.

BACKGROUND OF THE INVENTION

The invention relates to temperature sensors and, in particular, to an apparatus for containing a temperature sensing device or circuit.

Temperature sensors are commonly known in the art. One problem in providing an accurate temperature measurement is that of properly positioning the sensing element or sensing circuit in the environment in which the temperature is to be measured so as to produce an accurate heat transfer from the environment to the temperature sensing device. In the case of an integrated circuit temperature sensor, the device must also be sealed from contamination by corrosive elements in the environment. However, many techniques of sealing the temperature sensing device within a protective enclosure also tend to thermally insulate the temperature sensing device from the ambient environment thereby providing an error in the temperature measurement.

SUMMARY OF THE INVENTION

In general terms, the invention provides a temperature sensor assembly including means defining an enclosure such that at least a portion of the enclosure defining means is thermally conductive, a temperature sensing means disposed within the enclosure and means for conducting heat from the thermally conductive portion of the enclosure defining means to the temperature sensing means such that the heat conducting means includes means for insulating the temperature sensing means from the thermally conductive portion of the enclosure defining means.

More specifically, the invention provides a temperature sensor assembly including a temperature sensing circuit or device for measuring temperature. The assembly includes a connector having a recessed enclosure and a brass cup or liner in the enclosure. The cup or brass liner has a recessed surface and a thermally conductive, electrically insulating disk such as Kapton® or any of a number of suitable epoxies covers the recessed surface. The temperature sensing device is mounted on the disk so as to be electrically insulated from the liner.

A thermally conductive brass cap is mounted on the connector to enclose the enclosure and seal the temperature sensing device within the enclosure thereby protecting the device from contamination through contact with corrosive elements. The brass cap engages the brass liner in the enclosure so that heat from the ambient environment is thermally conducted to the brass cap, to the brass liner to the thermally conductive, electrically insulating disk and to the temperature sensing device or circuit.

The connector also includes a connector portion and at least one electrically conductive terminal extending between the connector portion and the enclosure. The temperature sensing device mounted on the disk is electrically connected to the terminal and a seal is provided between the terminal and the connector to prevent the introduction of contaminants into the enclosure. In one form, the seal includes a plurality of annular lands that are machined onto the terminal. The connector is molded around the terminal so that the material forming the connector engages the lands and forms a seal between the connector and the terminal.

The circuit generates an output at the terminal and the output can be used for any number of desired purposes. In one form, the temperature signal output of the terminal can be used to measure automobile oil temperature, automobile cabin temperature, outside air temperature, automobile engine coolant temperature, as well as many other temperature parameters.

It is a principal advantage of the invention to provide an apparatus for containing a temperature sensing device or circuit within a sealed connector so that ambient heat is thermally conducted to the temperature sensing device and so that the temperature sensing device is electrically insulated from the connector.

Other features and advantages of the invention will become apparent to those of ordinary skill in the art upon review of the following detailed description, claims and drawings.

BRIEF DESCRIPTION OF THE DRAWINGS

FIG. 1 is a perspective view of the temperature sensor assembly of the present invention.

FIG. 2 is a view taken along line 2—2 of FIG. 1.

FIG. 3 is an exploded view of the temperature sensor assembly of FIG. 1.

FIG. 4 is an enlarged partial view of FIG. 2.

DETAILED DESCRIPTION OF THE PREFERRED EMBODIMENT

The temperature sensor assembly of the present invention is generally designated in FIGS. 1–3 by reference numeral 10. As shown more specifically in FIGS. 2 and 3, the temperature sensor assembly 10 includes generally enclosure defining means 14 defining an enclosure 18, temperature sensing means 22 disposed within the enclosure defining means 14, and heat conducting means 26 for conducting heat from the enclosure defining means 14 to the temperature sensing means 22.

As a practical matter, the enclosure defining means 14 can assume any shape or be made from a variety of materials as long as at least a portion of the enclosure defining means 14 includes a thermally conductive portion. In the embodiment shown in the drawings, the enclosure defining means 14 includes a housing or connector 30. The connector 30 has an upper portion 34 and includes an internal cavity 38 in the upper portion 34. The internal cavity 38 at least partially defines the enclosure 18. The cavity 38 has a recessed surface 42 and a generally cylindrical sidewall 46 extending upwardly from the recessed surface 42. The cylindrical sidewall 46 includes an upper end 50 spaced from the recessed surface 42. The cavity 38 also includes a second recessed surface 54 which intersects the upper end 50 of the cylindrical sidewall 46. The second recessed surface 54 has an outer periphery 58 and an annular inset groove or recessed ring 62 extending around the outer periphery 58. The connector 30 includes an annular lip 66 which extends upwardly from the recessed ring 62 so as to completely surround the cavity 38 and an O-ring or sealing gasket 70 is mounted in the recessed ring 62. The connector 30 also includes an external surface 74. As best shown in FIG. 2, the external surface 74 defines a shoulder 78 adjacent the upper portion 34 of the connector 30, a cylindrical body portion 82 below the shoulder 78 and a connector portion 84 within the cylindrical body portion 82. The connector portion 84 includes a cylindrical cavity 86 within the cylindrical body portion 82. The cylindrical cavity 86 is adapted to fit onto the connector (not shown) of an electrical apparatus such as, for example, the computer module of an automobile (also not shown).

Referring generally to FIGS. 2 and 4, the heat conducting means 26 includes a cup or liner 90 mounted in the enclosure 18 on the recessed surface 42. The liner 90 can be formed of any suitable thermally conductive material such as brass, copper or other metals or even any of a number of thermally conductive electrically insulating materials such as Kapton® etc. In the embodiment shown in the drawings, the liner 90 is brass and includes a mounting surface 94 and a generally cylindrical sidewall 98 which extends upwardly from the mounting surface 94 and along the cylindrical sidewall 46 of the cavity 38 in the upper portion 34 of the connector 30. As shown specifically in FIGS. 3 and 4, the cylindrical sidewall 98 has an upper end 102 and the liner 90 includes an annular extension 106 extending from the upper end 102 of the cylindrical sidewall 98 outwardly along the second recessed surface 54. As best shown in FIG. 4, the extension 106 does not completely cover the second recessed surface 54 but extends only from the upper end 102 of the cylindrical sidewall 98 to the annular recessed ring 62 formed in the second recessed surface 54.

The temperature sensor assembly 10 also includes electrically insulating means or electrically insulating disk 110 for electrically insulating the mounting surface 94 of the liner 90. While various materials are appropriate for providing electrical insulation, the material of the preferred embodiment is preferably one which is highly thermally conductive and, yet, provides the requisite electrical insulation. Appropriate materials include Kapton® or other materials such as various epoxies that can be applied to the mounting surface 94.

The temperature sensing means 22 is a temperature sensor circuit 114 mounted on the insulating, thermally conductive disk 110. While any temperature sensing element could be utilized, the temperature sensor circuit 114 is preferably a fully integrated circuit temperature sensor mounted directly on the insulating disk 110. The temperature sensor circuit 114 is secured to the disk 110 using a thermally conductive adhesive (not shown). Three external electrical connections are required to operate the temperature sensor. Though not shown in the drawings, the electrical connections preferably include a power connection, a ground connection and an output connection.

As shown in FIG. 2, three terminals 130 (only two of which are shown in FIG. 2) are electrically connected to the power connection, the ground connection, and the output connection of the temperature sensor circuit 114. The terminals 130 each include an upper portion 132 adjacent the recessed surface 42 and the terminals 130 extend downwardly from the recessed surface 42 through the connector 30 to the external surface 74 of the connector 30 and into the cylindrical cavity 86 within the cylindrical body portion 82 of the connector 30. Each terminal 130 includes a plurality of annular or disk-shaped lands or flanges 134(a)–(g) which surround the upper portion 132 of each terminal 130 and are separated by recesses 138 (FIG. 2). As shown in detail in FIG. 4, the lands 134(a)–(f) each include a downwardly facing tapered surface 142 and the lands 134(b)–(g) each include an upwardly tapered surface 146. Each terminal 130 also includes surfaces 150 extending between the surfaces 142 and 146 of any two adjacent lands 134(a)–(g). The terminals 130 each have an upper surface 154 which extends through the liner 90, through the electrically insulating disk 110, and into the enclosure 18. The upper surfaces 154 are electrically connected to the power connection, ground connection and output connection of the temperature sensor by leads 158 (only two of which are shown in FIG. 4 of the drawings).

Each terminal 130 is molded into the connector 30 such that the material forming the connector 30 substantially fills the recesses 138 formed between each land 134(a)–(g). As a result, the surfaces 142 and 146 of the lands 134(a)–(g) form a seal with the connector 30 to prevent the formation of a leakage path between the terminal 130 and the connector 30 during thermal-cycling of the temperature sensor assembly 10, and prevent the introduction into the enclosure 18 of harmful corrosive elements or other undesirable materials in the ambient environment. During such thermal-cycling, the material forming the connector 30 may expand or contract slightly due to temperature fluctuations. If the material contracts, the material in the recesses 138 will tend to contract thereby pulling away from surfaces 142 and 146 defining each land 134(a)–(g). Nevertheless, a portion of the material will remain within recesses 138 and in complementary contact with the tapered surfaces 142 and 146 of any of the adjacent lands 134(a)–(g). As a result, each terminal 130 will remain positioned within the connector 30 and a seal will remain intact between surfaces 142 and 146 and the connector 30.

The enclosure defining means 14 of the temperature sensor assembly 10 further includes an end cap 162 (FIGS. 2 and 3) having a body portion 166 including a lower surface 170 (FIG. 2) and a cylindrical crimping wall 174 depending therefrom. The diameter of the crimping wall 174 is larger than the diameter of the upper portion 34 of the connector 30 defining the cavity 38. The crimping wall 174 extends over the annular lip 66 and over the shoulder 78 formed in the outer surface 74 of the connector 30 and is mechanically crimped over the shoulder 78 to securely attach the end cap 162 to the housing. In this position, the lower surface 170 of the end cap 162 engages the annular extension 106 of the brass liner 90 to provide a thermally conductive pathway between the end cap 162 and the brass liner 90. The lower surface 170 also engages the sealing gasket 70 to form a seal between the end cap 162 and the second recessed surface 54 of the connector 30 thereby completely enclosing the enclosure 18 to protect the temperature sensor circuit 114 from contact with corrosive elements in the environment. A thermally conductive liquid or gel-type compound (not shown) is applied to the extension 106 of the liner 90 so that it is between extension 106 and lower surface 170. The compound operates to maintain thermal conductivity between the liner 90 and the end cap 162 in the event that the end cap 162 separates slightly from the housing.

The end cap 162 also includes a threaded outer surface 178 (FIG. 3). The threaded outer surface 178 may be threaded into a receiving port (not shown) to connect the temperature sensor assembly 10 to an engine block or any other apparatus where it is desired to measure a temperature. Preferably, however, the end cap 162 is placed as close as possible to the environment in which the ambient temperature is to be measured.

In operation, the temperature sensor assembly 10 is placed in the environment in which it is desired to measure the ambient temperature. Heat or thermal energy is thermally conducted to the end cap 162 of the temperature sensor and through the end cap 162 to the brass cup or liner 90 to the insulating disk 110 and to the temperature sensor circuit 114 mounted on the insulating disk 110 within the enclosure 18. The temperature sensor circuit 114 generates an electrical output functionally related to the ambient temperature.

In one embodiment of the invention (not shown) the liner is formed from an electrically insulating, thermally conductive material thereby eliminating the need for the insulating disk between the temperature sensor circuit and the liner.

In another embodiment (not shown), the lower surface of the end cap defines an enclosure extending upwardly from the lower surface, and the upper portion of the connector has a generally flat mounting surface for mounting thereon the thermally conductive liner, the electrically insulating disk, if needed, and the temperature sensor circuit. The lower surface of the end cap has a crimping wall that extends over the shoulder in the upper surface of the connector and is mechanically crimped over the shoulder to securely attach the end cap to the housing.

Various features of the invention are set forth in the following claims.

We claim:

1. A temperature sensor assembly for measuring ambient temperature, the assembly comprising:
   a connector having an internal recess;
   a thermally conductive end cap sealingly fixed to said connector, the end cap and connector, including the internal recess, defining a sealed cavity;
   a temperature sensor located within the internal recess;
   heat conducting means for conducting heat from said end cap to said temperature sensor, the heat conducting means including a liner having a first portion located in the internal recess and a second portion located radially outside the internal recess and between the connector and the end cap and;
   an electrically insulative member located between the first portion of the liner and the temperature sensor.

2. A temperature sensor assembly as set forth in claim 1 wherein said thermally conductive cap includes a threaded connector portion.

3. A temperature sensor assembly as set forth in claim 1 wherein the electrically insulative member is an electrically insulating thermally conductive disk mounted between said liner and said temperature sensor to electrically insulate said temperature sensor from said liner and to allow thermal energy to be conducted from said liner to said temperature sensor.

4. A temperature sensor assembly as set forth in claim 1 and further including at least one electrically conductive terminal connected to said temperature sensor, said terminal having at least one land molded into the connector so as to prevent leakage of corrosive elements from the ambient environment into the sealed cavity.

5. A temperature sensor assembly as set forth in claim 4 wherein said terminal land includes a tapered annular surface engaging said connector to provide a seal between said terminal and said connector.

6. A temperature sensor assembly as set forth in claim 1 wherein said temperature sensor is an integrated circuit temperature sensor.

7. A temperature sensor assembly as set forth in claim 1 wherein said connector has an exterior surface and wherein said end cap has a deformable portion engaged with said exterior surface of said connector.

8. A temperature sensor assembly as set forth in claim 1 wherein said connector includes a shoulder surrounding said internal recess and wherein said liner is formed to mate with said shoulder and said internal recess.

9. A temperature sensor assembly as set forth in claim 1 wherein said temperature sensor is mounted on said liner.

10. A temperature sensor assembly for measuring ambient temperature, the assembly comprising:
    enclosure defining means including a connector having an internal recess and an external surface defining a shoulder, and the enclosure defining means including
    an end cap having a crimping wall engaging the shoulder, at least a portion of said end cap being thermally conductive;
    temperature sensing means disposed within said internal recess; and
    heat conducting means for conducting heat from said thermally conductive portion of said end cap to said temperature sensing means, said heat conducting means including a liner having a first portion located in the internal recess and having a second portion located radially outside the internal recess and between the connector and the end cap, the heat conducting means also including an electrical insulator electrically insulating said temperature sensing means from said liner.

11. A temperature sensor assembly as set forth in claim 10 wherein said temperature sensing means includes a temperature sensor circuit.

12. A temperature sensor assembly as set forth in claim 11 wherein the temperature sensor circuit is mounted on said electrical insulator.

13. A temperature sensor assembly as set forth in claim 10 wherein said liner is metallic and wherein said temperature sensing means is mounted on said liner so that thermal energy is transmitted from said thermally conductive portion of said end cap to said liner and to said temperature sensing means.

14. A temperature sensor assembly as set forth in claim 13 wherein the electrical insulator is thermally conductive so as to conduct thermal energy from said thermally conductive portion of the end cap to said temperature sensing means.

15. A temperature sensor assembly as set forth in claim 10 and further including at least one electrically conductive terminal connected to said temperature sensing means, said terminal having at least one land molded into the connector so as to prevent leakage of corrosive elements from the ambient environment into the enclosure defining means.

16. A temperature sensor assembly as set forth in claim 15 wherein said terminal land includes a tapered annular surface engaging said connector to provide a seal between said terminal and said connector.

17. A temperature sensor assembly as set forth in claim 10 and further comprising a seal member engaging said end cap and said shoulder.

18. A temperature sensor assembly as set forth in claim 10 wherein said enclosure defining means is a sealed enclosure.

19. A temperature sensor assembly for measuring ambient temperature, the assembly comprising:
    a connector including means defining a cavity including a recessed surface;
    a thermally conductive liner mounted in said means defining a cavity on said recessed surface, the liner providing a mounting surface,
    a thermally conductive, electrically insulating disk mounted on said mounting surface of said liner;
    an integrated circuit temperature sensor mounted on said disk; and
    a thermally conductive cap mounted on said connector enclosing said means defining a cavity and thereby defining an enclosure, sealing said temperature sensor within said enclosure, and engaging said liner such that ambient heat is absorbed by said cap and is conducted from said cap through said thermally conductive liner, through said thermally conductive, electrically insulating disk and to said temperature sensor.

20. A temperature sensor assembly as set forth in claim 19 and further including at least one electrically conductive terminal connected to said integrated circuit temperature sensor, said terminal having at least one land molded into the connector so as to prevent leakage into the enclosure of corrosive elements in the ambient environment.

21. A temperature sensor assembly as set forth in claim 20 wherein said terminal land includes a tapered annular surface engaging said connector to provide a seal between said terminal and said connector.

* * * * *